US008649466B2

(12) United States Patent
Sohn

(10) Patent No.: US 8,649,466 B2
(45) Date of Patent: Feb. 11, 2014

(54) DEVICE AND METHOD FOR DETECTING CYCLIC PREFIX LENGTH

(75) Inventor: Kyung Yeol Sohn, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 602 days.

(21) Appl. No.: 12/887,841

(22) Filed: Sep. 22, 2010

(65) Prior Publication Data

US 2011/0150144 A1    Jun. 23, 2011

(30) Foreign Application Priority Data

Dec. 21, 2009  (KR) ........................ 10-2009-0128408

(51) Int. Cl.
*H04L 27/06*    (2006.01)
*H04L 27/00*    (2006.01)

(52) U.S. Cl.
USPC ............ 375/340; 375/324; 375/219; 375/316

(58) Field of Classification Search
USPC ............... 375/219, 220, 222, 240.26–240.28, 375/285, 284, 295, 296, 316, 324, 340, 341, 375/339, 221, 254, 346, 347, 260
See application file for complete search history.

(56) References Cited

U.S. PATENT DOCUMENTS

| 2006/0146947 A1* | 7/2006 | Kim ............................... 375/260 |
| 2006/0171367 A1* | 8/2006 | Wang ............................ 370/342 |
| 2007/0002726 A1 | 1/2007 | Zangi |
| 2009/0225707 A1* | 9/2009 | Baldemair et al. ............ 370/329 |

FOREIGN PATENT DOCUMENTS

| KR | 10-2007-0087449 | 2/2006 |
| KR | 10-2009-0043756 | 10/2007 |
| KR | 10-2009-0029900 | 3/2009 |

* cited by examiner

*Primary Examiner* — Sam K Ahn
*Assistant Examiner* — Linda Wong
(74) *Attorney, Agent, or Firm* — Staas & Halsey LLP

(57) ABSTRACT

A device for detecting a cyclic prefix length according to the present invention includes: a plurality of cyclic prefix length searchers that receive a received signal from a transmitting apparatus to search different cyclic prefix lengths for the received signal; a normalizer that receives and normalizes a plurality of search results received from each of the plurality of cyclic prefix length searchers and outputs a plurality of normalization values; and a determining unit that determines any of the normalization values as the cyclic prefix length of the received signal.

15 Claims, 8 Drawing Sheets

DEVICE AND METHOD FOR DETECTING CYCLIC PREFIX LENGTH

CROSS-REFERENCE TO RELATED APPLICATION

This application claims priority to and the benefit of Korean Patent Application No. 10-2009-0128408 filed in the Korean Intellectual Property Office on Dec. 21, 2009, the entire contents of which are incorporated herein by reference.

BACKGROUND OF THE INVENTION (a) Field of the Invention

The present invention relates to a device and method for detecting a cyclic prefix length.

(b) Description of the Related Art

A communication system in an orthogonal frequency division multiplexing (OFDM) scheme divides all channels into narrowband sub-channels having a orthogonality and transmits them, thereby making it possible to effectively overcome selective fading of a frequency. The OFDM scheme inserts a cyclic prefix with a longer period than a delay spread of a channel into a front end of a symbol to maintain the orthogonality of the symbol, thereby making it possible to remove inter-symbol interference (ISI). As a result, the OFDM scheme is effective in high-rate data transmission.

However, the advantage of the OFDM scheme is possible only when the inter-subcarrier orthogonality is maintained. Therefore, when the orthogonality is broken, adjacent inter-channel interference (ICI) occurs, thereby deteriorating system performance. Therefore, in the system in the OFDM scheme, time and frequency synchronization of the receiving apparatus are important.

Meanwhile, a receiving apparatus such as a mobile station, etc., performs timing synchronization of an OFDM signal by using a preamble signal transmitted by the base station. Generally, the preamble includes an active symbol having a predetermined fast Fourier transform (FFT) size and a cyclic prefix that is inserted in front of the active symbol. The cyclic prefix is the same as a signal of the last period of the active symbol.

The receiving apparatus receives the preamble from the transmitting apparatus, and should accurately know a start position of a signal in order to demodulate the signal using the fast Fourier transform (FFT).

Meanwhile, in the OFDM-based communication system, the downlink preamble is used in initial synchronization, frequency offset, and cell search, and has a structure in which a pattern in a time domain is repeated by a predetermined frequency and is symmetrical, after an inverse fast Fourier transform (IFFT).

The OFDM signal supports various cyclic prefix lengths according to the condition where the system is applied. Therefore, the mobile station receiving the downlink should detect the cyclic prefix length that is used in the base station to transmit and receive the signal.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device and method that accurately and effectively detects a cyclic prefix length in a communication system of an OFDM scheme.

An exemplary embodiment of the present invention provides a device for detecting a cyclic prefix length, including: a plurality of cyclic prefix length searchers that receive a received signal from a transmitting apparatus to search different cyclic prefix lengths for the received signal; a normalizer that receives and normalizes a plurality of search results received from each of the plurality of cyclic prefix length searchers and outputs a plurality of normalization values; and a determining unit that determines any of the normalization values as the cyclic prefix length of the received signal.

The normalizer further may output any one of the plurality of search results as a reference maximum value.

The determining unit may determine the cyclic prefix length searched by any one of the plurality of cyclic prefix length searchers as the cyclic prefix length of the received signal.

Any one cyclic prefix length searcher may be a cyclic prefix length searcher that outputs the search results that is the base of the normalization value having the least samples exceeding a threshold value of the plurality of normalization values.

The threshold value may be determined based on the reference maximum value.

The received signal is a preamble, the preamble may include a cyclic prefix, a first active symbol period, and a second active symbol period having the same size as the first active symbol, the cyclic prefix may form an autocorrelation with the last period of the first active symbol, and the cyclic prefix may form the autocorrelation with the last period of the second active symbol period.

Each of the plurality of cyclic prefix length searchers may include a first autocorrelator that performs the autocorrelation by using the received signal and a first delay signal delaying the received signal, a second autocorrelator that performs the autocorrelation by using the received signal and a second delay signal delaying the received signal, an averager that obtains an average value between the output signal of the first autocorrelator and the output signal of the second autocorrelator, and a comparator that compares the average value with the threshold value to output the average value only when the average value is larger than the threshold value.

The first delay signal may be a signal that is delayed by half the size of the preamble.

Each of the first autocorrelators may include a delayer that generates the first delay signal, a first accumulator that accumulates a product result of the first delay signal and the received signal of as many as the cyclic prefix length, a first calculator that calculates an absolute value of the output result from the first accumulator, a squarer that calculates a squared value of the output result from the first calculator, a first energy calculator that calculates an energy of the first delay signal, a second energy calculator that calculates an energy of the received signal, a second accumulator that accumulates a result of summing the output signal of the first energy calculator and the output signal of the second energy calculator, a second calculator that calculates a reciprocal number of the output result from the second accumulator, and a multiplier that multiplies the output result of the squarer by the output result of the second calculator and outputs it as the output result of the first autocorrelator.

Each of the first autocorrelators may further include a conjugate converter that generates a conjugate of the first delay signal and outputs it to be multiplied by the received signal.

The second delay signal may be a signal that is delayed by the size of the preamble.

Each of the second autocorrelators may include a delayer that generates the second delay signal, a first accumulator that accumulates a product result of the second delay signal and the received signal of as many as the cyclic prefix length, a first calculator that calculates an absolute value of the output result from the first accumulator, a squarer that calculates a squared value of the output result from the first calculator, a first energy calculator that calculates an energy of the second delay signal, a second energy calculator that calculates an energy of the received signal, a second accumulator that accumulates a result of summing the output signal of the first energy calculator and the output signal of the second energy calculator, a second calculator that calculates a reciprocal number of the output result from the second accumulator, and a multiplier that multiplies the output result of the squarer by the output result of the second calculator and outputs it as the output result of the first autocorrelator. Each of the second autocorrelators may further include a conjugate converter that generates a conjugate of the second delay signal and outputs it to be multiplied by the received signal.

The normalizer may include a plurality of maximum value searchers that search a maximum value of each of the plurality of search results, and a plurality of reciprocal calculators that calculate reciprocal values of each of the plurality of maximum values.

Each of the plurality of normalization values may be a value that is found by dividing the search results of the cyclic prefix length searcher corresponding to the plurality of normalization values among the plurality of cyclic prefix length searchers by the maximum value of the search result.

A method for detecting a cyclic prefix length according to another embodiment of the present invention provides the method for detecting the cyclic prefix length by a detection device, including: receiving a signal from a transmitting apparatus; generating a plurality of search results by searching a plurality of different cyclic prefix lengths based on the signal; obtaining a plurality of normalization values that correspond to each of a plurality of search results; and determining any one of the plurality of normalization values as a cyclic prefix length of a received signal.

The determining may include determining the cyclic prefix length applied to any one of the plurality of cyclic prefix length searchers as the cyclic prefix length of the received signal.

The received signal is a preamble, the preamble includes a cyclic prefix, a first active symbol period, and a second active symbol period having the same size as the first active symbol, the cyclic prefix may form an autocorrelation with the last period of the first active symbol, and the cyclic prefix may form the autocorrelation with the last period of the second active symbol period.

The obtaining the plurality of normalization values may include searching maximum values of each of the plurality of search results, calculating reciprocal values of each of the plurality of maximum values, and determining as each of the plurality of normalization values a value that is found by dividing the search results of the cyclic prefix length searcher corresponding to the plurality of normalization values among the plurality of cyclic prefix length searchers by the maximum value of the search result.

The generating the plurality of search results may include performing first autocorrelation by using the received signal and a first delay signal that delays the received signal by half the size of the preamble, performing second autocorrelation by using the received signal and a second delay signal that delays the received signal by the size of the preamble, obtaining an average value between the result of the first autocorrelation and the result of the second autocorrelation, comparing the average value with a threshold value, and searching the maximum value of the average value when the average value is larger than the threshold value.

According to the embodiment of the present invention, it can quickly and effectively detect the cyclic prefix length applied to the downlink signal by using the preamble signal that has the temporally repeated structure in the communication system of the OFDM scheme. According to the embodiment of the present invention, it can accurately detect the cyclic prefix length, thereby making it possible to prevent errors from occurring in the demodulation of the receiving apparatus.

DETAILED DESCRIPTION OF THE EMBODIMENTS

Figure 1:
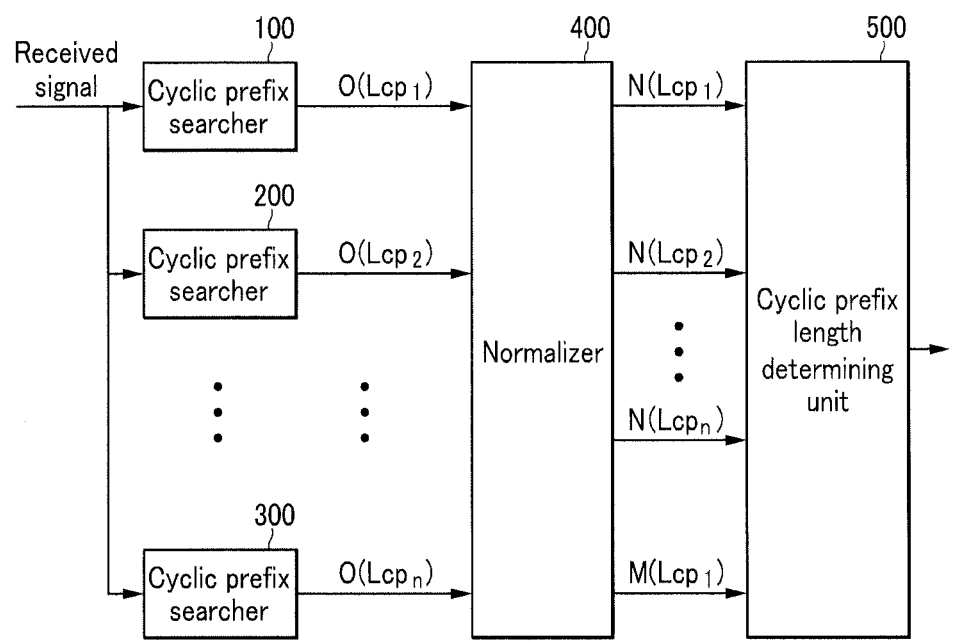
FIG. 1 is a block diagram of a device for detecting a cyclic prefix length according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

A device for detecting a cyclic prefix length according to an exemplary embodiment of the present invention will be described in detail with reference to FIGS. 1 and 2.

Figure 2:
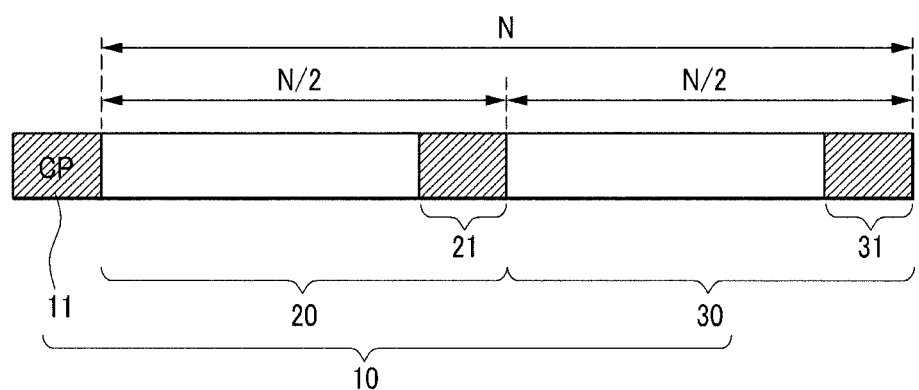
FIG. 2 is a diagram showing a preamble received in a device for detecting a cyclic prefix length according to an exemplary embodiment of the present invention.

FIG. 1 is a block diagram of a device for detecting a cyclic prefix length according to an exemplary embodiment of the present invention, and FIG. 2 is a diagram showing a preamble received in a device for detecting a cyclic prefix length according to an exemplary embodiment of the present invention.

Referring to FIG. 1, the device for detecting a cyclic prefix length according to the exemplary embodiment of the present invention includes a plurality of cyclic prefix searchers 100, 200, and 300, a normalizer 400, and a cyclic prefix length determining unit 500.

The cyclic prefix searchers 100, 200, and 300 search a received signal from a transmitting apparatus, that is, a preamble, to search each of various cyclic prefix lengths. Herein, the cyclic prefix searchers 100, 200, and 300 search different lengths of the cyclic prefixes for the received signal. In other words, the cyclic prefix searcher 100 can search the cyclic prefixes with a length of $L_{cp1}$, the cyclic prefix searcher 200 can search the cyclic prefixes with a length of $L_{cp2}$, and the cyclic prefix searcher 300 can search the cyclic prefixes with a length of $L_{cpn}$.

Meanwhile, the preamble received in each of the cyclic prefix searchers 100, 200, and 300 is shown in FIG. 2.

Referring to FIG. 2, the preamble 10 includes a cyclic prefix (CP) 11 and active symbol periods 20 and 30. The active symbol periods 20 and 30 have an N size, wherein N is a size of a fast Fourier transform (FFT). The active symbol periods 20 and 30 includes two periods 20 and 30 each of which has an N/2 size. Each period 20 and 30 includes the same periods 21 and 31 as the cyclic prefix 11 at the end thereof. The preamble may be based on an orthogonal frequency division multiplexing (OFDM) scheme.

Referring again to FIG. 1, the normalizer 400 receives output values ($O(L_{cp1})$, $O(L_{cp2})$, and $O(L_{cpn})$) from the plurality of cyclic prefix searchers 100, 200, and 300, and normalizes each of them to output normalization values ($N(L_{cp1})$, $N(L_{cp2})$, and $N(L_{cpn})$) and reference maximum values ($M(L_{cp1})$) to the cyclic prefix length determining unit 500.

The cyclic prefix length determining unit 500 sets 80% to 90% of the reference maximum value ($M(L_{cp1})$) as the threshold value to determine the cyclic prefix length, which is applied to the searcher having the least samples exceeding the threshold value among the normalization values ($N(L_{cp1})$, $N(L_{cp2})$, and $N(L_{cpn})$), as the resulting value.

The cyclic prefix searchers 100, 200, and 300 of the device for detecting a cyclic prefix length according to the exemplary embodiment of the present invention will be described in detail with reference to FIG. 3.

Figure 3:
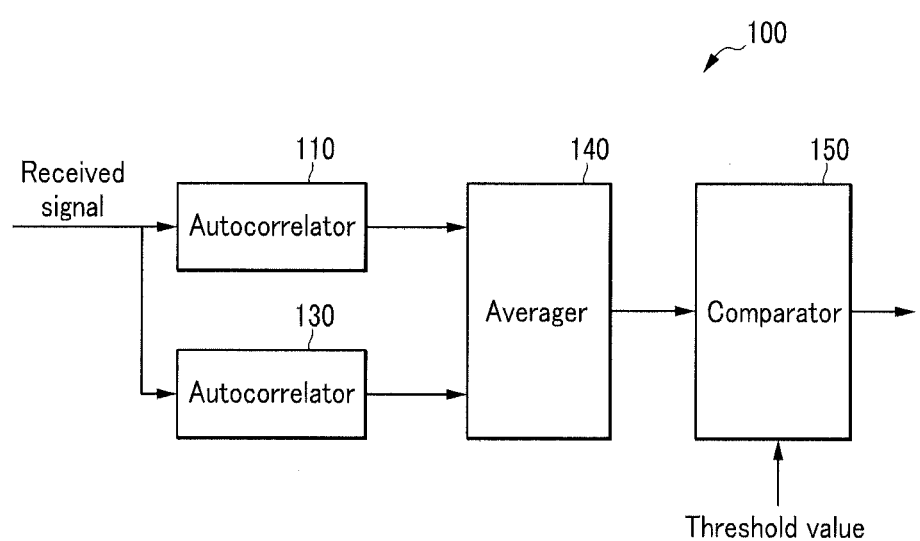
FIG. 3 is a block diagram of the cyclic prefix searcher according to the exemplary embodiment of the present invention.

FIG. 3 is a block diagram of the cyclic prefix searcher according to the exemplary embodiment of the present invention.

Referring to FIG. 3, the cyclic prefix searcher 100 includes autocorrelators 110 and 130, an averager 140, and a comparator 150.

The autocorrelator 110 performs the autocorrelation by using a received signal and a received signal delayed by an N/2 sample. Herein, the received signal is a preamble 10 shown in FIG. 2, and N is a size of the active symbol period 20 and 30 of the preamble 10.

The autocorrelator 130 performs the autocorrelation by using the received signal and the received signal delayed by an N sample.

The averager 140 receives the output signal of the autocorrelator 110 and the output signal of the autocorrelator 130 to obtain an average value between the two output signals.

The comparator 150 receives a threshold value and receives an average value from the averager 140, and compares the threshold value with the average value, thereby determining the validity of the average value.

Meanwhile, although the cyclic prefix searcher 100 is mainly described in FIG. 3, FIG. 3 is not limited to the cyclic prefix searcher 100, and the cyclic prefix searchers 200 and 300 may also have a similar structure.

The autocorrelator 110 of the device for detecting a cyclic prefix length according to the exemplary embodiment of the present invention will be described in detail with reference to FIG. 4.

Figure 4:
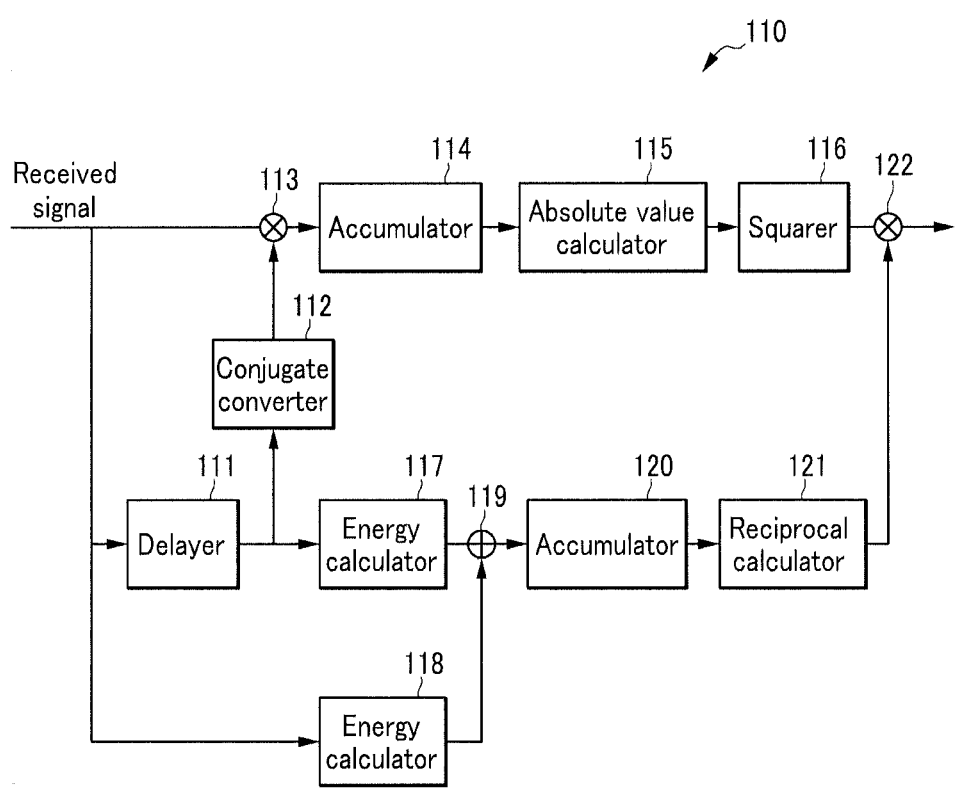
FIG. 4 is a block diagram of the autocorrelator according to the exemplary embodiment of the present invention.

FIG. 4 is a block diagram of the autocorrelator according to the exemplary embodiment of the present invention.

Referring to FIG. 4, the autocorrelator 110 includes a delayer 111, a conjugate converter 112, multipliers 113 and 122, accumulators 114 and 120, an absolute value calculator 115, a squarer 116, energy calculators 117 and 118, an adder 119, and a reciprocal calculator 121.

The delayer 111 delays the received signal by an N/2 sample.

The conjugate converter 112 obtains a conjugate of a signal delayed by an N/2 sample.

The multiplier 113 receives the received signal and a conjugate of the signal delayed by an N/2 sample and multiplies them.

The accumulator 114 receives the product result from the multiplier 213 and accumulates it by the cyclic prefix length.

The absolute value calculator 115 calculates the absolute value for the output signal from the accumulator 114.

The squarer 116 calculates the squared value for the output signal from the absolute value calculator 115 and outputs it.

The energy calculator 117 calculates energy for a signal delayed by an N/2 sample from the delayer 111 and the energy calculator 118 calculates energy for the received signal.

The adder 119 adds the energy received from each of the energy calculators 117 and 118.

The accumulator 120 receives the addition result from the adder 119 and accumulates it.

The reciprocal calculator 121 calculates the reciprocal number for the output signal from the accumulator 120 and outputs it.

The multiplier 122 multiplies the squared value from the squarer 116 by the reciprocal number from the reciprocal calculator 121 and outputs it as the output signal of the autocorrelator 110.

Meanwhile, in FIG. 4, the autocorrelator 110 is mainly described, but the autocorrelator 130 is also similar to FIG. 4 and the autocorrelator 130 performs the autocorrelation process based on a signal delayed by an N sample.

The normalizer 400 of the device for detecting a cyclic prefix length according to the exemplary embodiment of the present invention will be described in detail with reference to FIG. 5.

Figure 5:
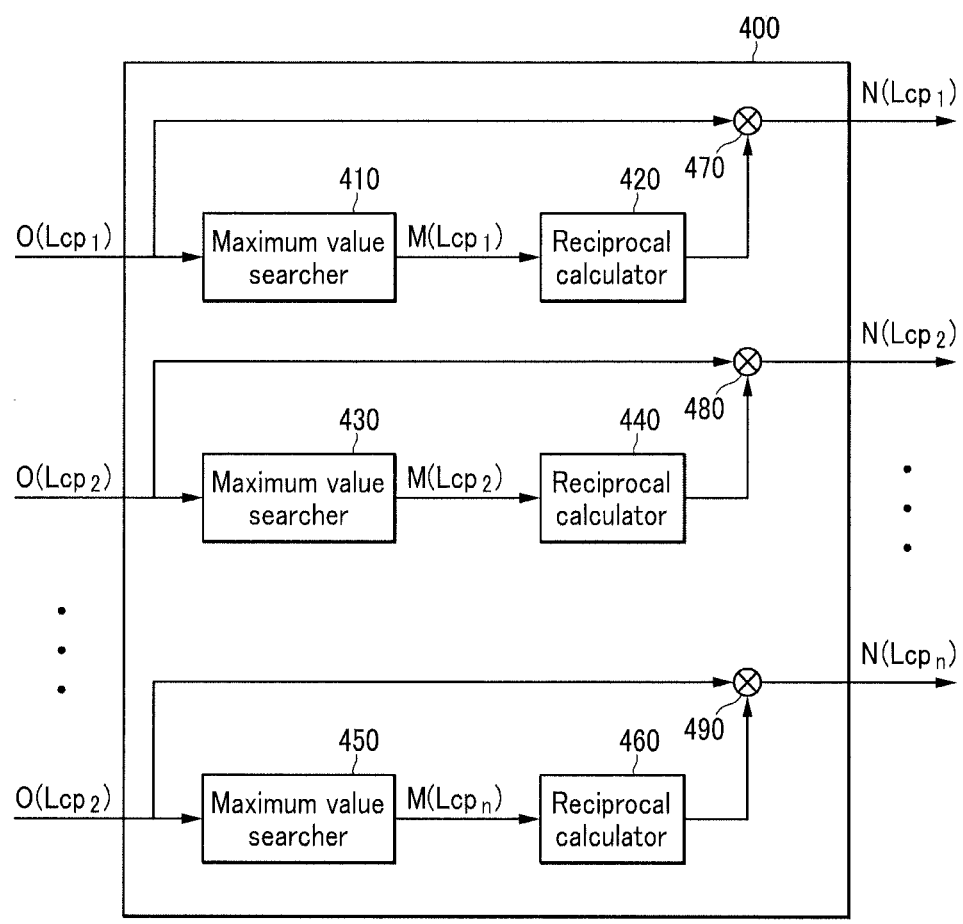
FIG. 5 is a block diagram of the normalizer according to the exemplary embodiment of the present invention.

FIG. 5 is a block diagram of the normalizer according to the exemplary embodiment of the present invention.

Referring to FIG. 5, the normalizer 400 includes a plurality of maximum value searchers 410, 420, and 430, a plurality of reciprocal calculators 440, 450, and 460, and multipliers 470, 480, and 490.

The normalizer 400 receives output values ($O(L_{cp1})$, $O(L_{cp2})$, and $O(L_{cpn})$) from the cyclic prefix searchers 100, 200, and 300, and outputs them as normalization values ($N(L_{cp1})$, $N(L_{cp2})$, and $N(L_{cpn})$).

The maximum value searcher 410 receives the output value ($O(L_{cp1})$) from the cyclic prefix searcher 100 and searches a maximum value ($M(L_{cp1})$) and outputs them. The reciprocal calculator 420 receives the maximum value ($M(L_{cp1})$) from the maximum value searcher 410 and obtains the reciprocal value of the maximum value ($M(L_{cp1})$) and outputs it.

The maximum value searcher 430 receives the output value ($O(L_{cp2})$) from the cyclic prefix searcher 200 and searches the maximum value ($M(L_{cp2})$) and outputs it. The reciprocal calculator 440 receives the maximum value ($M(L_{cp2})$) from the maximum value searcher 430 to obtain the reciprocal value of the maximum value (M($L_{cp2}$)) and output it.

The maximum value searcher 450 receives the output value (O($L_{cpn}$)) from the cyclic prefix searcher 300 and searches the maximum value (M($L_{cpn}$)) and outputs it. The reciprocal calculator 460 receives the maximum value (M($L_{cpn}$)) from the maximum value searcher 450 and obtains the reciprocal value of the maximum value (M($L_{cpn}$)) and outputs it.

The multiplier 470 receives the output value (O($L_{cp1}$)) from the cyclic prefix searcher 100 and multiplies it by the maximum value (M($L_{cp1}$)) of the reciprocal calculator 420 and outputs it the normalization value (N($L_{cp1}$)).

The multiplier 480 receives the output value (O($L_{cp2}$)) from the cyclic prefix searcher 200 and multiplies it by the reciprocal value of the maximum value (M($L_{cp2}$)) from the reciprocal calculator 440 and outputs it the normalization value (N($L_{cp2}$)).

The multiplier 490 receives the output value (O($L_{cpn}$)) from the cyclic prefix searcher 300 and multiplies it by the reciprocal value of the maximum value (M($L_{cpn}$)) from the reciprocal calculator 460 and outputs it as the normalization value (N($L_{cpn}$)).

The normalization values (N($L_{cp1}$), N($L_{cp2}$), and N($L_{cpn}$)) output from the normalizer 400 through the above process depends on the following Equation 1, Equation 2, and Equation 3.

$$N(L_{CP1})=O(L_{CP1})/M(L_{CP1}) \quad \text{[Equation 1]}$$

$$N(L_{CP2})=O(L_{CP2})/M(L_{CP2}) \quad \text{[Equation 2]}$$

$$N(L_{CPn})=O(L_{CPn})/M(l_{CPn}) \quad \text{[Equation 3]}$$

Hereinafter, the output of the normalizer 400 according to the exemplary embodiment of the present invention will be described in detail with reference to FIGS. 6 and 7.

Figure 6:
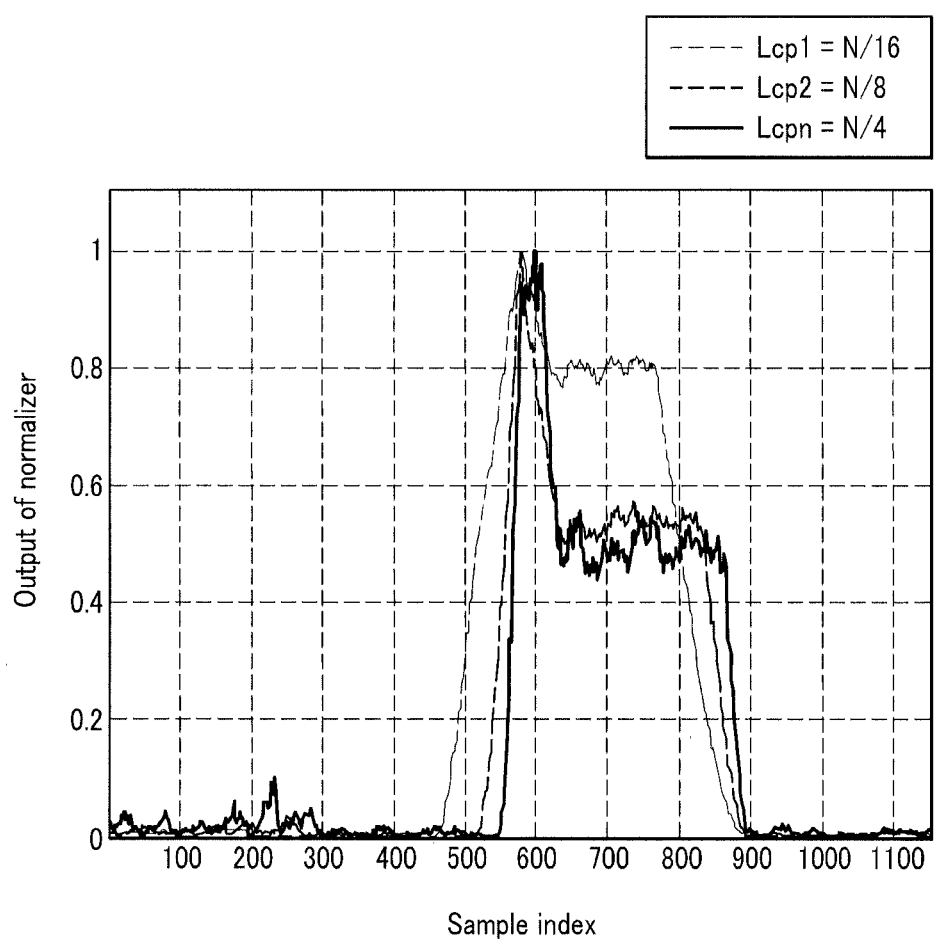
FIG. 6 is a graph showing the output of the normalizer according to the exemplary embodiment of the present invention based on various sample indexes.
Figure 7:
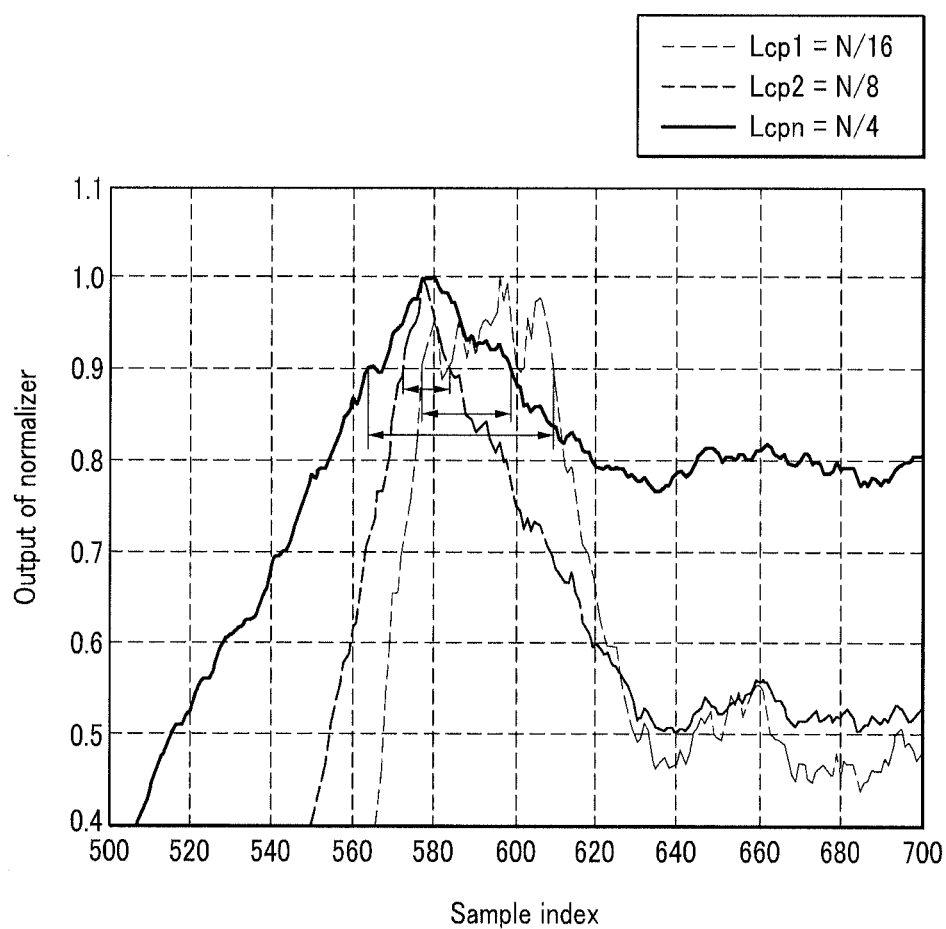
FIG. 7 is a graph showing the output of the normalizer for some sample indexes in the graph of FIG. 6 in detail.

FIG. 6 is a graph showing the output of the normalizer according to the exemplary embodiment of the present invention based on various sample indexes, and FIG. 7 is a graph showing the output of the normalizer for some sample indexes in the graph of FIG. 6 in detail.

In FIGS. 6 and 7, it is assumed that the size N of the fast Fourier transform (FFT) becomes 512, the cyclic prefix length becomes 64, that is, N/8, the length $L_{cp1}$ of the cyclic prefix searched by the cyclic prefix searcher 100 becomes N/16, the length $L_{cp2}$ of the cyclic prefix searched by the cyclic prefix searcher 200 becomes N/8, the length $L_{cpn}$ of the cyclic prefix searched by the cyclic prefix searcher 300 becomes N/4, a signal-to-noise ratio (SNR) becomes 0 dB, and a channel noise is an additive white Gaussian noise (AWGN).

Referring to FIGS. 6 and 7, 90% of the normalized maximum value is set as the threshold value of the length determining unit 500 of the cyclic prefix, and when the number of samples exceeding the corresponding value is set, it can be appreciated that the number of samples related to the length $L_{cp2}$ of the cyclic prefix searched by the cyclic prefix searcher 200 is least. Therefore, the length $L_{cp2}$ of the cyclic prefix is determined as the final length.

Hereinafter, a method for detecting a cyclic prefix length according to an exemplary embodiment of the present invention will be described in detail with reference to FIG. 8.

Figure 8:
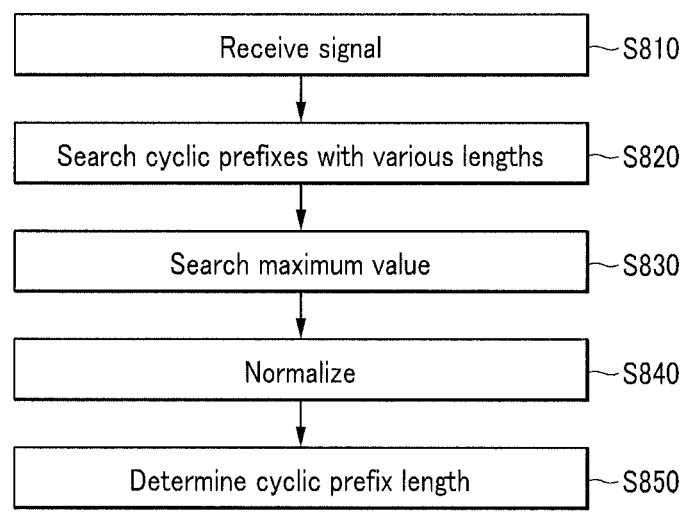
FIG. 8 is a flowchart showing a method for detecting a cyclic prefix length according to an exemplary embodiment of the present invention.

FIG. 8 is a flowchart showing a method for detecting a cyclic prefix length according to an exemplary embodiment of the present invention.

Referring to FIG. 8, the device for detecting a cyclic prefix length receives a signal from a transmitting apparatus (S810). Herein, the signal is a preamble.

The device for detecting a cyclic prefix length searches the lengths of various cyclic prefixes based on the received signal, respectively (S820). At this time, the searching step of the cyclic prefix length (S820) delays the received signal by an N/2 sample and by an N sample to autocorrelate the received signal with the signal delayed by an N/2 sample and the received signal with the signal delayed by an N sample. Then, the average value of two autocorrelation results is obtained and the validity of the average values is determined.

Thereafter, the device for detecting a cyclic prefix length search searches the maximum values of the searched results (S830).

Thereafter, the device for detecting a cyclic prefix length obtains the normalization values (N($L_{cp1}$), N($L_{cp2}$), and N($L_{cpn}$)) based on the searched maximum values (M($L_{cp1}$), M($L_{cp2}$), and M($L_{cpn}$)). Herein, the normalization values (N($L_{cp1}$), N($L_{cp2}$), and N($L_{cpn}$)) may be determined according to Equation 1.

The device for detecting a cyclic prefix length determines the cyclic prefix length based on the normalization values (N($L_{cp1}$), N($L_{cp2}$), and N($L_{cpn}$)) (S850). Describing in detail, a predetermined value based on the maximum value (M($L_{cp1}$) is set as the threshold value to determine the cyclic prefix length applied to the searcher having the least samples exceeding the threshold value among the normalization values (N($L_{cp1}$), N($L_{cp2}$), and N($L_{cpn}$)) as the resulting values.

As described above, the cyclic prefix length is variously searched by the plurality of cyclic prefix length searchers and the reliability of the resulting value is increased, such that the cyclic prefix length can be quickly and effectively detected. Thereby, the cyclic prefix length is accurately detected, thereby making it possible to prevent the errors occurring in the demodulation of the receiving apparatus.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for detecting a cyclic prefix length, comprising:
   a plurality of cyclic prefix length searchers that receive a received signal from a transmitting apparatus to search different cyclic prefix lengths for the received signal;
   a normalizer that receives and normalizes a plurality of search results received from each of the plurality of cyclic prefix length searchers and outputs a plurality of normalization values; and
   a determining unit that determines any of the plurality of normalization values as a cyclic prefix length of the received signal,
   wherein the normalizer further outputs any one of the plurality of search results as a reference maximum value, and
   wherein the determining unit determines the cyclic prefix length searched by any one of the plurality of cyclic prefix length searchers as the cyclic prefix length of the received signal, and wherein each cyclic prefix length searcher among the plurality of cyclic prefix length searchers outputs a search result, each search result is normalized, and the normalized search result among the plurality of normalized search results having the least samples exceeding a threshold value is determined as the cyclic prefix length of the received signal, and wherein the normalizer comprises:

a plurality of maximum value searchers that search a maximum value of each of the plurality of search results; and a plurality of reciprocal calculators that calculate reciprocal values of each of the plurality of maximum values.

2. The device of claim 1, wherein the threshold value is determined based on the reference maximum value.

3. The device of claim 1, wherein the received signal is a preamble, and the preamble comprises a cyclic prefix, a first active symbol period, and a second active symbol period having a same size as the first active symbol, the cyclic prefix forms an autocorrelation with a last period of the first active symbol, and the cyclic prefix forms the autocorrelation with a last period of the second active symbol period.

4. The device of claim 3, wherein each of the plurality of cyclic prefix length searchers comprises a first autocorrelator that performs the autocorrelation by using the received signal and a first delayed received signal, a second autocorrelator that performs the autocorrelation by using the received signal and a second delayed received signal, an averager that obtains an average value between an output signal of the first autocorrelator and an output signal of the second autocorrelator, and a comparator that compares the average value with the threshold value to output the average value only when the average value is larger than the threshold value.

5. The device of claim 4, wherein the first delayed received signal is a signal delayed by half the size of the preamble.

6. The device of claim 5, wherein each of the first autocorrelators comprises: a delayer that generates the first delayed received signal;

a first accumulator that accumulates a product result of the first delayed received signal and the received signal;

a first calculator that calculates an absolute value of an output result from the first accumulator;

a squarer that calculates a squared value of an output result from the first calculator; a first energy calculator that calculates an energy of the first delayed received signal; a second energy calculator that calculates an energy of the received signal;

a second accumulator that accumulates a result of summing an output signal of the first energy calculator and an output signal of the second energy calculator;

a second calculator that calculates a reciprocal number of an output result from the second accumulator; and a multiplier that multiplies an output result of the squarer by an output result of the second calculator and outputs a result of the multiplication as an output result of the first autocorrelator.

7. The device of claim 6, further comprising a conjugate converter that generates a conjugate of the first delayed received signal and outputs the conjugate of the first delayed received signal to be multiplied with the received signal.

8. The device of claim 4, wherein the second delayed received signal is a signal delayed by a size of the preamble.

9. The device of claim 8, wherein each of the second autocorrelators comprises:

a delayer that generates the second delayed received signal;

a first accumulator that accumulates a product result of the second delayed received signal and the received signal;

a first calculator that calculates an absolute value of an output result from the first accumulator;

a squarer that calculates a squared value of an output result from the first calculator;

a first energy calculator that calculates an energy of the second delayed received signal;

a second energy calculator that calculates an energy of the received signal;

a second accumulator that accumulates a result of summing an output signal of the first energy calculator and an output signal of the second energy calculator;

a second calculator that calculates a reciprocal number of an output result from the second accumulator; and a multiplier that multiplies an output result of the squarer by an output result of the second calculator and outputs an output result of the multiplier as an output result of the first autocorrelator.

10. The device of claim 9, further comprising a conjugate converter that generates a conjugate of the second delayed received signal and outputs the generated conjugate of the second delayed received signal to be multiplied by the received signal.

11. The device of claim 1, wherein each of the plurality of normalization values is a value found by dividing each search result of the plurality of cyclic prefix length searchers corresponding to each of the plurality of normalization values by the maximum value corresponding to each of the plurality of search results.

12. A method for detecting a cyclic prefix length by a detection device, comprising:

receiving a signal from a transmitting apparatus;

generating a plurality of search results by searching a plurality of different cyclic prefix lengths based on the received signal;

obtaining a plurality of normalization values that correspond to each of a plurality of search results; and determining any one of the plurality of normalization values as a cyclic prefix length of the received signal, wherein the obtaining the plurality of normalization values comprises searching maximum values of each of the plurality of search results, calculating reciprocal values of each of the plurality of maximum values, and determining as each of the plurality of normalization values as a value that is found by dividing each of the plurality of search results corresponding to each of the plurality of normalization values by the maximum values corresponding to each of the plurality of search results.

13. The method of claim 12, wherein the determining comprises determining the cyclic prefix length applied to any one of the plurality of cyclic prefix length searchers as the cyclic prefix length of the received signal.

14. The method of claim 12, wherein the received signal is a preamble, and the preamble comprises a cyclic prefix, a first active symbol period, and a second active symbol period having a same size as the first active symbol, the cyclic prefix forms an autocorrelation with the last period of the first active symbol, and the cyclic prefix forms the autocorrelation with the last period of the second active symbol period.

15. The method of claim 12, wherein the generating the plurality of search results comprises performing first autocorrelation by using the received signal and a first delayed received signal with a delay of half the size of a preamble, performing second autocorrelation by using the received signal and a second delayed received signal with a delay of the size of the preamble, obtaining an average value between a result of the first autocorrelation and a result of the second autocorrelation, comparing the average value with a threshold value, and searching the maximum value of the average value when the average value is larger than the threshold value.

* * * * *